Patented Oct. 23, 1951

2,572,085

UNITED STATES PATENT OFFICE 2,572,085

ALKYD RESINS

Harold Wittcoff and John Robert Roach, Minneapolis, Minn., assignors to General Mills, Inc., a corporation of Delaware No Drawing. Application May 8, 1947, Serial No. 746,852

3 Claims. (Cl. 260—22)

The present invention relates to alkyl resins and more particularly to alkyd resins which are formed by the esterification with a polybasic acid of a polyhydric alcohol resulting from the condensation of a polyhydroxy compound with a polyfunctional alkylating agent.

It is, therefore, a primary object of the present invention to provide alkyd resins having new and unusual properties resulting from the esterification of a polyhydric alcohol resulting from the condensation of a polyhydroxy compound with a polyfunctional alkylating agent.

The present invention contemplates the production of straight alkyd resins as well as the modified alkyds in which unsaturated monobasic fatty acids may be employed in addition to the polybasic acid. The unmodified alkyds are characterized by hardness, high melting points, short cure time, and great solubility in organic solvents. The fatty acid modified alkyds possess fast drying times, yield films which are very hard and offer great resistance to water, alkali, other chemicals, and to abrasion. In addition, the films are pliable and flexible, and demonstrate good adhesion to wood, metal, and glass.

The polyhydric alcohols which are employed in the present invention are those disclosed and claimed in our copending application entitled Polyhydric Alcohols, Serial No. 705,489, filed October 24, 1946, now Patent No. 2,537,726. These polyhydric alcohols result from the condensation of a polyhydroxy compound with a polyfunctional alkylating agent. Moreover, these polyhydric alcohols result from the reaction in which the total number of groups in the reactants capable of entering the alkylation reaction is at least 5. It is believed that under these circumstances, the condensation results in a certain amount of cross-linking between molecules of the polyhydroxy compound and produces a different type of polyhydric alcohol. Such alcohols possess a large number of hydroxyl groups for esterification. In the preparation of modified alkyds, unsaturated fatty acids may react with several of these hydroxyl groups to yield a compound of high polymeric functionality. This high degree of functionality allows the alkyd to be polymerized in a multiplicity of ways when it is exposed to air. Thus these new compositions have the added advantage that modified alkyds which dry rapidly may be prepared from acids of semi-drying oils. Despite the high degree of functionality, it is nevertheless possible to prepare, without serious danger of gelation, modified alkyds of "short" oil length, that is, compositions in which a large proportion of polybasic acid is used in proportion to the monobasic acid. Good results are also obtained when the new polyhydric alcohols are mixed with known polyhydric alcohols, such as glycerol and the like, and the resultant mixture used for the production of alkyds.

Besides the high functionality of the alcohols employed, these alcohols have an added advantage in that it is believed that the alcohols possess cross-linking. This cross-linking enhances the cross-linking which results from the employment of the polyfunctional acid used in esterification. As a result of the cross-linking, the alcohols themselves may be of a considerably larger molecular weight than the polyhydric alcohols heretofore available. Thus, for example, when glycerol and glycerol dichlorohydrin are condensed, a polyhydric alcohol may be obtained having a molecular weight of the order of 800. It will thus be seen that the use of such alcohols is of considerable value in the production of resin molecules of high molecular weight.

As has been pointed out above, the polyhydric alcohols which are esterified in the present invention are those which result from the condensation of a polyhydroxy compound with a polyfunctional alkylating agent. The polyhydroxy compound may contain two or more hydroxyl groups and likewise the polyfunctional alkylating reagent may contain two or more alkylating groups. However for the purposes of the present invention, it is necessary that at least one of the compounds entering the alkylation reaction contain at least three reactive groups. Thus the polyhydroxy compound may contain three or more hydroxyl groups, such as is the case with glycerol, or it may contain two hydroxyl groups and an alkylating group such as is the case with glycerol monochlorohydrin. The alkylating reagent may contain a pair of alkylating groups and a hydroxyl group, as for example, glycerol dihalohydrin. The polyhydric alcohols employed for esterification in the present invention are obtained when the total number of groups in the reactants capable of entering into the alkylation reaction is at least 5.

In preparing the polyhydric alcohol, considerable variation is possible in the polyhydroxy compound employed as well as in the polyfunctional alkylating agent. Suitable polyhydroxy compounds or derivatives thereof, include ethylene glycol, propylene glycol, butylene glycol, glycerol, diglycerol, triglycerol, higher polyglycerols, pentaerythritol, dipentaerythritol, higher polypentaerythritols, 2,2,6,6-tetramethylolcyclohexanol, 3,3,5,5-tetramethylol-pyran-4-ol, 3,3,5-trimethylol-5-methylpyran-4-ol, 3,5-dimethylol-3,5-dimethylpyran-4-ol, erythritol, xylitol, sorbitol, mannitol, sucrose, and the like. In addition, there may be employed such compounds as glycerol monochlorohydrin; glycerol dichlorohydrin; mono- or dichlorohydrins of diglycerol, triglycerol, tetraglycerol, etc., which may be prepared as disclosed in our copending application, Serial No. 705,485, entitled Halohydroxypropyl Ethers, filed on October 24, 1946; monoallylglycerol; monoallyldiglycerol which may be obtained as a by-product in the preparation of monoallylglycerol; monoallyldiglycerolmonochlorohydrin which may be obtained by the addition of one mole of hypochlorous acid to diallylglycerol; glycidol, glycerolglycidol; diglycerolglycidol; pentaerythritol mono- or dihalohydrin; and chloro- derivatives of 2,2,6,6 - tetramethylolcyclohexanol or 2,2,6,6-tetramethylolpyran-4-ol; epichlorohydrin; the diepoxide of diallyl ether; the diepoxide of diallylglycerol; and the like. It will be noted that there are included compounds such as glycerol dichlorohydrin which contains only one hydroxyl group. However, under the conditions of the alkylation reaction, once the alkylation process starts, some of the halogen atoms are replaced by hydroxyl groups, making the compound, in effect, a polyhydroxy compound. The term "polyhydroxy compound" used herein and in the claims is intended to include those compounds which possess free hydroxyl groups as well as those which possess potential hydroxyl groups which become available during the etherification process.

It is to be noted that the polyhydroxy compounds used in the alkylation reaction herein disclosed are of relatively low molecular weight as compared with higher polymeric polyhydroxy compounds, such as starch, cellulose and the like, which would not be suitable for the instant purpose as they form products which are insoluble, etc.

Suitable polyfunctional alkylating reagents include glycerol dihalohydrins (chloro, bromo, iodo), epihalohydrin, diglyceroldihalohydrin, triglyceroldihalohydrin, the diepoxide of diallyl ether, the diepoxide of diallyl glycerol, tetraglyceroldihalohydrin, and similar reagents which serve not only to introduce cross-linking, but which at the same time, introduce additional hydroxyl groups into the molecule, thus serving the very valuable purpose of increasing the hydroxyl functionality. Many of these alkylating agents may be made in accordance with the teachings of the above referred to halohydroxypropyl ethers case. Thus diglyceroldihalohydrin may be made by a hypohalous acid addition to diallyl ether; triglyceroldihalohydrin by the hypohalous acid addition to diallylglycerol; the diepoxide of diallyl ether and the diepoxide of diallylglycerol by treatment of the corresponding halohydrin with strong alkali; tetraglyceroltrihalohydrin by the hypohalous acid addition to triallylglycerol. Still other compounds which have been found valuable as polyfunctional alkylating reagents include 1,4-dichlorobutene-2, 1,2-dichlorobutene-3, any of the dichloropropylenes, and similar compounds. These reagents introduce not only cross-linking, but also carbon-to-carbon unsaturation which imparts valuable properties to the polyhydric alcohol, especially if it is to be converted to derivatives which are to be polymerized. Still other reagents which have been found valuable as di- or higher polyfunctional alkylating reagents include 2-chloroethyl ether, ethylene dichloride, ethylene dibromide, 1,2,3-trichloropropane, the bis-(chloromethyl)-benzenes, 2,4-dichloronitrobenzene, and in fact any compound containing two or more halogen atoms which are fairly reactive.

The alkyd resins of the present invention may employ any of the usual polybasic acids heretofore employed for this purpose, such as phthalic, maleic, fumaric, methylene disalicylic, diphenic, 1,8-naphthalic, succinic, malic, adipic, suberic, dicrotonic, diglycollic, malonic or substituted malonic, sebacic, camphoric, tetrahydrophthalic, acetylcitric, citraconic, itaconic acids which result from the hydrolysis of the condensation products of methyl acrylate or acrylonitrile or similar compounds with water, ammonia, primary amines, and the like, and acids which result from the addition of maleic anhydride to unsaturated compounds, such, for example, as an adduct of maleic anhydride and isoprene, and in fact any polybasic acid sufficiently stable to withstand the reaction conditions necessary for alkyd preparation.

Any usual method of esterification may be employed. For example, reagents may be simply mixed and heated until the desired degree of esterification is attained. In view of the great reactivity of the new alcohols, there is some danger of gelation, just as there is when glycerol is condensed in an alkyd. This may be avoided by the addition of such substances as rosin, acetic anhydride, non-drying oils, or saturated aliphatic acids. The resultant alkyd resins are very hard and brittle and possess high melting points and short cure times. They likewise possess good solubility in organic solvents. The alkyd resins so produced may be used in the impregnation of paper, in finishing textiles, as binding agents for various materials, and in general for various types of laminating, casting, coating, impregnating, and adhesive applications.

Of still greater importance, however, are the modified alkyd resins which may be prepared by heating together the new polyhydroxy compounds with any of the above-mentioned polybasic acids, together with a monocarboxylic acid or a mixture of such acids which may be either saturated or unsaturated. In place of the monobasic acids, an oil may be used which on hydrolysis yields monocarboxylic fatty acids. The monobasic acids which are preferred include those obtained by the hydrolysis of such oils as tung, perilla, oiticica, sunflower, safflower, soybean, linseed, dehydrated castor, and in fact any drying or semi-drying oil. However, it must be mentioned that non-drying acids from oils such as palm, corn, or cottonseed, are also useful because of their plasticizing effect. These modified alkyds prepared from acids of drying or semi-drying oils have a much faster drying rate than the original glycerides and yield films which are many times harder, and which are much more abrasive-resistant and resistant to the action of alkali, water, and chemicals.

The modified alkyds so prepared are useful in the preparation of rapid drying paints, varnishes, and enamels. They also find application in the preparation of printing inks, linoleum, oil cloth and the like.

In the preparation of the modified alkyd resins, it is sometimes preferable to react the polyhydric alcohol with the monobasic acid for a short period of time. Thereafter, the polybasic acid is added and the reaction is continued until a low acid number is attained. Where an oil is used in place of the monobasic acid, the reagents may be heated together to effect an ester interchange which liberates free glycerol. This may be removed, or else sufficient polybasic acid may be included in order to neutralize it.

The esterifications may be carried out according to any of the procedures known to the art. In general, a slight excess of polyhydric alcohol is used, and an inert atmosphere and stirring are employed. If desired, a catalyst such as zinc or lead stearate may be used to accelerate the reaction. An azeotropic procedure in which a small amount of xylene or similar solvent is used has been found very practical. By controlling the quantity of solvent, any desired temperature may be obtained, and the amount of water removed is an indication of the extent of the reaction. The temperatures employed may vary from 180° to 250° C. At the end of the reaction a vacuum may be applied to remove the last traces of volatile material.

*Example 1*

Pentaerythritol (272 parts) was mixed with aqueous sodium hydroxide (50%, 704 parts) after which the mixture was heated at 90° C. for thirty minutes. Glycerol dichlorohydrin (516 parts) was added with stirring over a period of four and one-half hours at a temperature which did not exceed 105° C. Thereafter, the reaction mixture was heated and stirred for one-half hour longer, after which the reaction mixture was diluted with methanol, neutralized with dilute hydrochloric acid and filtered. The filtrate was desolvated under reduced pressure and the product was obtained by methanol extraction. The resulting syrup had a hydroxyl content of 29.0%.

A mixture of this condensation product (60 parts) and soybean oil acids (137.5 parts) was heated and stirred with zinc stearate (2.2 parts) at 160–200° C. for ninety minutes. The water of reaction was removed azeotropically with xylene. The reaction mixture was cooled and phthalic anhydride (37 parts) was added. The reaction was continued at 220° C. for four hours during which time the theoretical quantity of water collected and the acid number was reduced to 17.0. The thick product had a hydroxyl number of 10.2, a saponification equivalent of 263.0, and an iodine number of 110.6. It was diluted with xylene to yield a 50% solution with a specific gravity at 25° C. of 0.921.

A film from this product dried hard in one hour whereas a similar product from pentaerythritol required three hours for drying. When immersed in water, the film started to whiten in four hours whereas the film from the pentaerythritol product whitened in two hours. The film was likewise more flexible and exhibited more "life" than the film from the pentaerythritol product.

*Example 2*

Glycerol (95%, 679 parts) and sodium hydroxide (50%, 1200 parts) were mixed and heated to 90° C. To the stirred mixture was added over a period of five hours 903 parts of glycerol dichlorohydrin, after which the reaction was allowed to continue for two hours longer. The cooled mixture was diluted with methanol, neutralized with concentrated hydrochloric acid, and filtered. Evaporation of the solvent yielded a mixture of product and salt from which the product was extracted with methanol. There was obtained a syrup with a hydroxyl content of 28.8%.

This material (127.4 parts) was reacted with soybean oil acids (275 parts) in the presence of zinc stearate (2.2 parts) as indicated in the previous example. Phthalic anhydride (74 parts) was then added and the reaction mixture was stirred at 220–230° C. for five and one-half hours. At the end of this time practically the theoretical quantity of water had collected and the acid number of the product was 8. The thick material had an iodine number of 89.3, and a saponification equivalent of 232.6. It was diluted with xylene to yield a 50% solution with a specific gravity at 25° C. of 0.938. The product dried in two hours to a hard film which was very flexible and abrasion resistant.

*Example 3*

Glycerol (95%, 776 parts) was mixed with aqueous sodium hydroxide (50%, 704 parts) and cooled externally. The mixture was heated to 90° C. and glycerol dichlorohydrin (516 parts) was added with stirring over a period of four and one-half hours. The reaction was continued at 90–95° C. with stirring for a total reaction time of seven hours. The condensation mixture was neutralized and the product was isolated as described in the preceding example. From this product excess glycerol (305 parts) was removed by distillation at reduced pressure. The residue was taken up in methanol, filtered, and the filtrate was concentrated to yield 675 parts of product with a hydroxyl content of 33.2%.

This condensation product (55 parts) was reacted with soybean oil acids (137.5 parts) in the presence of zinc stearate (2.2 parts) as indicated in Example 1. Thereafter phthalic anhydride was added (37 parts) and the reaction was continued at 220° C. for four hours at which time the theoretical quantity of water had collected and the acid number was 4.2. The product had an iodine number of 91.3, and a saponification equivalent of 218.2. A 50% xylene solution had a specific gravity of 0.936 at 25° C. and a film from this dried hard within two hours and demonstrated excellent water resistance.

*Example 4*

The condensation product described in Example 2 (174 parts) was heated with phthalic anhydride (222 parts) for one hour at 145–200° C. The resulting product was light in color and possessed an acid number of 147.0 and a cure time at 200° C. of about six minutes.

While various modifications of this invention have been described, it is to be understood that the same is not limited thereto, but may be varied within the scope of the following claims.

We claim as our invention:

1. A modified alkyd resin comprising the ester reaction product of a polybasic carboxylic acid, soybean oil fatty acids, and a non-distillable cross-linked polymeric polyhydric alcohol, said polyhydric alcohol resulting from the substantially complete condensation under alkaline conditions of glycerol dichlorhydrin with a polyhydroxy compound selected from the group consisting of pentaerythritol and glycerol, the glycerol dichlorhydrin being employed in the relative proportion of from one-half to two moles per mole of polyhydroxy compound.

2. A modified alkyd resin comprising the ester reaction product of a polybasic carboxylic acid, soybean oil fatty acids, and a non-distillable cross-linked polymeric polyhydric alcohol, said polyhydric alcohol resulting from the substantially complete condensation under alkaline conditions of glycerol dichlorhydrin with glycerol, the glycerol dichlorhydrin being employed in the relative proportion of from one-half to two mols per mol of glycerol.

3. An alkyd resin according to claim 2 in which the polybasic carboxylic acid is phthalic acid.

HAROLD WITTCOFF.
JOHN ROBERT ROACH.

REFERENCES CITED

The following references are of record in the file of this patent:

UNITED STATES PATENTS

| Number | Name | Date |
|---|---|---|
| 1,424,137 | Weisberg et al. | July 25, 1922 |
| 1,696,337 | Symmes | Dec. 25, 1928 |
| 1,922,459 | Schmidt et al. | Aug. 15, 1933 |
| 2,182,397 | Eckey | Dec. 5, 1939 |
| 2,363,016 | Oertling | Nov. 21, 1944 |
| 2,409,332 | Woodruff | Oct. 15, 1946 |